Feb. 5, 1952 E. E. McMILLAN ET AL 2,584,603
SHEARS WITH INTERCHANGEABLE CUTTING BLADE
Filed July 25, 1950
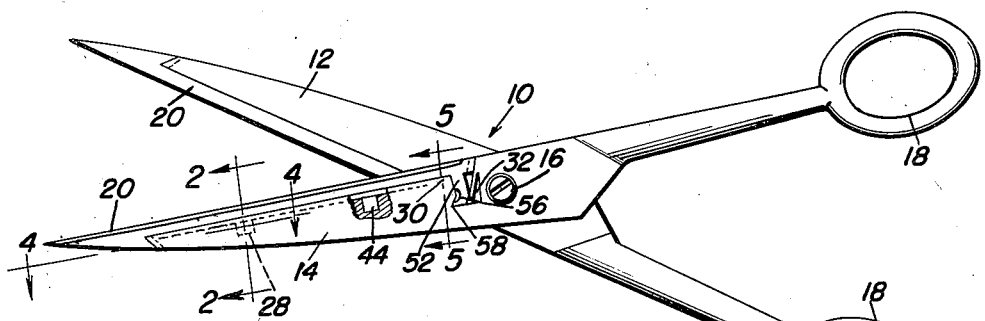
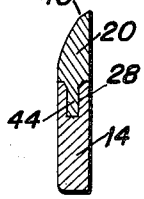
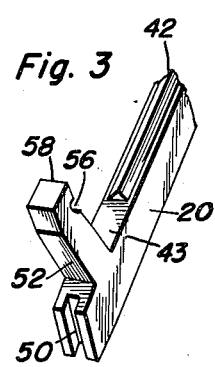
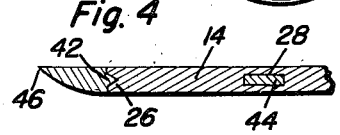
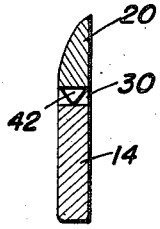
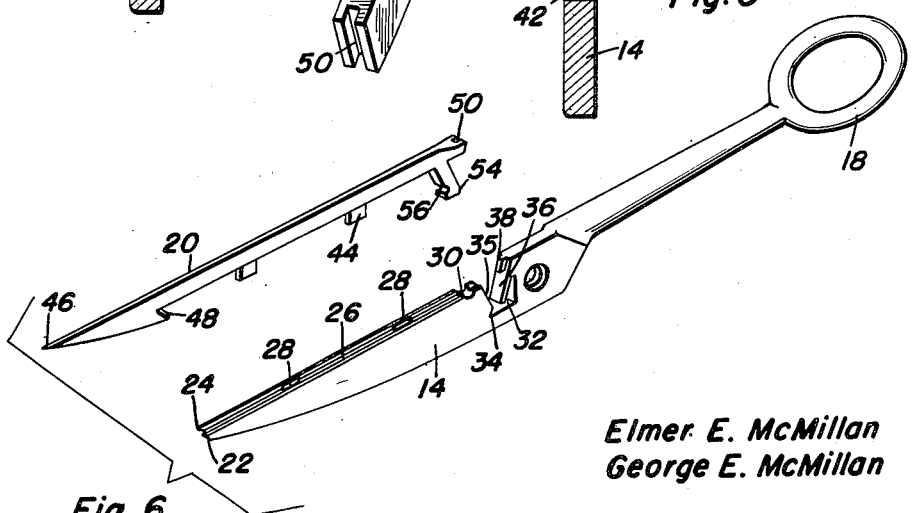
Elmer E. McMillan
George E. McMillan
INVENTORS Patented Feb. 5, 1952

2,584,603

UNITED STATES PATENT OFFICE 2,584,603

SHEARS WITH INTERCHANGEABLE CUTTING BLADE

Elmer E. McMillan and George E. McMillan, Mansfield, Mo.

Application July 25, 1950, Serial No. 175,712

1 Claim. (Cl. 30—349)

This invention relates to a shears or scissors of novel construction having removable cutting blades so that the blades can be removed when worn without the necessity of entirely discarding the shears stock.

Shears and scissors are employed in large quantities by housewives and caterers, and heretofore after the cutting edges of the blades have become dulled, it was necessary to have the blades resharpened or to entirely discard the shears or scissors. The primary object of the present invention is to provide shears or scissors having removable cutting blades which can be readily and easily replaced when dulled without sacrificing the shears stock.

Another important object of this invention is to provide a shears with interchangeable and removable cutting blades which is so constructed and designed that the blades can be readily assembled and disassembled from the shears stock, the stock and the blades being provided with special locking means to prevent both longitudinal and endwise relative movement of the blades on the shears stock.

Yet another important object of this invention is to provide a shears of the character described which is relatively simple in design and is produced by a practical and durable method of construction, inexpensive to manufacture in large quantities, neat in appearance, and very useful for its intended purpose.

These, together with various ancillary objects and features of the invention which will later become apparent as the following description proceeds, are attained by the device, a preferred embodiment of which has been illustrated by way of example only in the accompanying drawings, wherein:

Figure 1 is a top plan view of the shears, parts being broken away to show details of construction;

Figure 2 is a sectional view taken substantially on the plane of section line 2—2 of Figure 1;

Figure 3 is a fragmentary perspective view of the rear portion of the blades;

Figure 4 is a sectional view taken substantially on the plane of section line 4—4 of Figure 1;

Figure 5 is a sectional view taken substantially on the plane of section line 5—5 of Figure 1; and, Figure 6 is a group perspective view of a shears stock and removable blades.

Specific reference is now made to the drawings. In the several views in the accompanying drawings and in the following specification reference characters indicate corresponding elements throughout.

Indicated generally at 10 is a conventional shears or scissors having shears stocks 12 and 14 pivotally interconnected in a conventional manner as at 16, the rear end of the stock being provided with the finger engaging eyes 18. The removable blades are indicated at 20 and are received on each of the shears stocks 12 and 14 as shown clearly in Figure 1 and, since both blades and both shears stocks are identical in construction, only one of the blades and stocks will be completely described hereinafter.

The shears stock 14 includes a forward end which is angulated as at 22 to provide a point 24 and the upper edge of the stock is provided further with a longitudinally extending V-shaped groove 26. It should further be noted at this point that the V-shaped groove 26 is not only provided in the upper edge of the shears stock 14 but also extends into the angulated front end 22 and around the pointed end 24 as shown clearly in Figures 4 and 6. Extending through the V-shaped groove 26 and partially into the stock 14 in longitudinally spaced positions are substantially rectangular notches 28 for a purpose later to appear. Through the upper edge of the shears stock is provided a semi-circular notch 30 and it will be seen that adjacent this semi-circular notch, the upper edge of the shears stock 14 is discontinued and is provided with a somewhat longer recess 32 which has a pointed forward edge as at 34. As shown clearly in the drawings, the forward edge 35 of the recess is inclined rearwardly.

Integral with the shears stock is a forwardly inclined spring arm 36 which extends into the recess 32, the spring arm carrying adjacent its upper edge a relatively short tongue 38 which is forwardly inclined.

The blade 20 is provided at its outer edge with a bevelled cutting surface 40, while its inner edge carries a longitudinally extending V-shaped tongue 42 which is received in the V-shaped groove 26 in the shears stock 14. While this tongue and groove connection is necessary to properly position the blade on the shears stock, it is necessary to provide additional means for preventing endwise movement of the blade relative to the shears stock. Accordingly, at longitudinally spaced positions, the inner edge of the blade 20 is provided with depending substantially rectangular projections 44 that are appropriately received in the notches 28 in the shears stock 14.

To prevent longitudinal movement of the blade relative to the shears stock, the front end of the blade is pointed as at 46 and is further provided with an angulated notch 48 which receives the angulated portion 22 and the pointed portion 24 of the shears stock 14, the V-shaped tongue 42 of the blade extending into the angulated notch 48 and being received in the V-shaped groove 26 of the shears stock as shown clearly in Figure 4. The rear end of the blade is provided with a longitudinally extending bifurcation or groove 50 which is forwardly inclined and receives the tongue 38 on the upper edge of the spring arm 36. Adjacent the bifurcated end 50 of the blade is a depending projection 52 which is perpendicular to the blade and includes a somewhat flattened heel portion 54. The projection has some resiliency. Opposite the heel portion 54 is a semi-circular notch 56 for a purpose later to appear. The projection 52 also includes a forwardly curved hook portion 58. The projection 52 is pressed into the recess 32 and because of the rearwardly inclined edge 35 of the recess, the projection will be forced over this edge. The projection will bend slightly in the middle and create an extreme tension pull from the front end of the blade along its entire length. The spring arm 36 then bears against the flattened heel portion 54 to urge the hook end 58 thereof into firm engagement with the hook portion 34 of the recess 32 in the shears stock as shown clearly in Figure 1 whereby the pull along the length of the blade is lockingly maintained. Thus the forward and rear end construction of the blade in cooperation with the angulated forward portion 22 of the shears stock and the recess 32 and spring arm 36 act to prevent any possible longitudinal movement of the blade relative to the shears stock and will also cause an effective downward pressure along the entire length of the blade.

In use, the blade 20 is positioned on the shears stock 14 and pressed into place with finger pressure in a manner which will be readily apparent to those skilled in the art. Because of the special construction of the blade and shears stock, it will be readily understood that the blade will be held in firm position on the stock with little possibility of endwise and longitudinal movement of the blade on the stock. To remove the blade from the stock, a sharp pointed instrument is inserted in the semi-circular or arcuate grooves 30 and 56 so that the rear end and projection 52 of the blade will be lifted from the recess 32 and free of the spring arm 36 to allow for complete removal of the blade. To allow for the proper insertion of a pointed instrument in the groove 30, the V-tongue 42 on the blade 20 is discontinued immediately adjacent the projection 52 to provide a flat surface 43 overlying the groove 30. The short tongue 38 and the bifurcation 50 are forwardly inclined to allow for proper meshing inasmuch as the blade 20 comes into place on the shears stock 14 in a circular motion pivoted about the pointed end 24.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

A shears comprising a stock having a transverse recess in its rear end portion, said recess having an inclined front wall provided with a notch in its lower portion, a tongue on the rear wall of the recess, a removable blade mounted on the stock and having a groove in its rear end for the reception of the tongue, a hook on the rear end portion of the blade engageable in the notch in the recess of the front wall for anchoring said blade in position, a spring in the recess on the rear wall thereof beneath the tongue and engaged with the hook for yieldingly urging same into the notch, and means for detachably securing the front end of the blade on the stock.

ELMER E. McMILLAN.
GEORGE E. McMILLAN.

REFERENCES CITED

The following references are of record in the file of this patent:

UNITED STATES PATENTS

| Number | Name | Date |
| --- | --- | --- |
| 1,433,391 | McCaw | Oct. 24, 1922 |
| 1,615,882 | Luedtke | Feb. 1, 1927 |
| 1,623,130 | Otis | Apr. 5, 1927 |

FOREIGN PATENTS

| Number | Country | Date |
| --- | --- | --- |
| 649,969 | France | Dec. 31, 1928 |